3,159,611
PREPARATION OF POLYMERS WHICH CONTAIN THE N-OXIDE FUNCTION

Jesse T. Dunn and David T. Manning, Charleston, W. Va., assignors to Union Carbide Corporation, a corporation of New York
No Drawing. Filed Apr. 3, 1961, Ser. No. 100,017
13 Claims. (Cl. 260—88.3)

This invention relates, in general, to polymers containing the amine-oxide group. In one aspect, this invention relates to a process for the preparation of homopolymers and copolymers containing a plurality of pyridine N-oxide groups.

The recent work of F. E. Cislak, U.S. Patent 2,749,349, teaches the preparation of monomeric vinylpyridine N-oxides and discloses that these compounds can be polymerized to form hard, tough, non-brittle resins, or copolymerized with numerous other monomers to give elastomers possessing valuable, rubber-like properties. In either case, the polymer would be prepared by polymerization of the vinylpyridine N-oxide monomer. However, it has been observed that the preparation of fully oxidized homopolymers and copolymers from monomeric vinylpyridine N-oxides suffers from several disadvantages and limitations. For example, synthesis of vinylpyridine N-oxides by the method disclosed in the aforementioned patent entails the formation of the hydroxyethylpyridine starting materials, oxidation of the pyridine nitrogen to the N-oxide, and finally dehydration to the unsaturated product. Inasmuch as there is a tendency towards uncontrolled polymerization of the vinylpyridine-N-oxide during the dehydration step, the isolation of any suitable quantity of the pure form of the reactive monomer for use in copolymerization would undoubtedly not be economical for commercial operation. Furthermore, while the 2- and 4-hydroxyethyl-substituted pyridine derivatives are easily prepared by the reaction of formaldehyde with the corresponding 2- or 4-methyl substituted compounds, no simple route exists for the preparation of the 3- or 5-hydroxyethylpyridines and their corresponding vinylpyridine N-oxide derivatives.

In addition to the expense of the starting materials and the isolation of the monomer there are other disadvantages attending the polymerization of vinylpyridine N-oxides. The tendency for uncontrolled polymerization presents problems in handling the vinylpyridine N-oxides while, on the other hand, vinylpyridine monomers may be purified prior to polymerization, by simple distillation techniques and stored safely in the presence of conventional inhibitors until ready for use. Moreover, the N-oxide monomers are stable only in the forms of addition compounds with water or salts, and therefore must be used in these forms for polymerization. Finally, the techniques of polymerizing and copolymerizing vinylpyridine compounds are well known to those skilled in the art, whereas little information is available concerning the techniques necessary for polymerization of the corresponding N-oxide compounds.

Accordingly, one or more of the following objects will be achieved by the practice of the instant invention. It is an object of the present invention to provide a novel process for the preparation of fully oxidized vinylpyridine homopolymers and copolymers. A further object of the present invention is to provide a process for the preparation of partially oxidized vinylpyridine homopolymers and copolymers. Another object is to provide a process for preparing copolymers containing the N-oxide function which are prepared from vinylpyridine and other vinyl monomers. A still further object of the present invention is to provide vinylpyridine polymers containing the N-oxide function which are useful where a hard, tough, non-brittle resin is required. Another object of the present invention is to provide copolymers containing the N-oxide function which have valuable rubber-like properties. These and other objects will become readily apparent to those skilled in the art in the light of the teachings herein set forth.

In its broad aspect, this invention is directed to a novel process for the preparation of polymers containing pyridine N-oxide groups. The process comprises oxidizing a polymeric compound containing pyridine groups with an organic oxidizing agent and recovering the resulting oxidized product. Inasmuch as the oxidizing agent reacts with the polymeric compound containing the pyridine groups under mild conditions, the process can be carried out with a minimum of operating difficulty. By the process of the present invention it is thus possible to impart most any degree of oxidation desired to the polymeric compound. For example, polymers have been prepared ranging from a partially oxidized polymer to a fully oxidized polymer.

To facilitate the understanding of the instant invention various terms will be defined. At the outset it should be noted that the term "N-oxide function" as employed throughout the specification and appended claims refers to compounds containing the

group. The term "nitrogen oxidizing agent" as employed throughout the specification is used to encompass oxidizing agents which react primarily with the pyridine nitrogen without substantially affecting other groups which may be present. The term "polymer" or "polymeric compound" are used to encompass both homopolymers and copolymers containing the aforementioned pyridine groups.

Unless otherwise stated, by the term "reduced viscosity" as used herein, is meant a value obtained by dividing the specific viscosity by the concentration of the polymeric compound in the solution, the concentration being measured in grams of polymer per 100 milliliters of solvent at a given temperature, and is regarded as a measure of molecular weight. The specific viscosity is obtained by dividing the difference between the viscosity of the solution of polymer and the viscosity of the solvent by the viscosity of the solvent. The reduced viscosities herein referred to are measured at a concentration of 0.2 gram of vinylpyridine polymer in 100 milliliters of dimethylformamide at 30° C.

In one embodiment, the present invention is directed to a process for preparing fully and partially oxidized homopolymers of vinylpyridines. The following reaction illustrates the process wherein complete oxidation is effected:

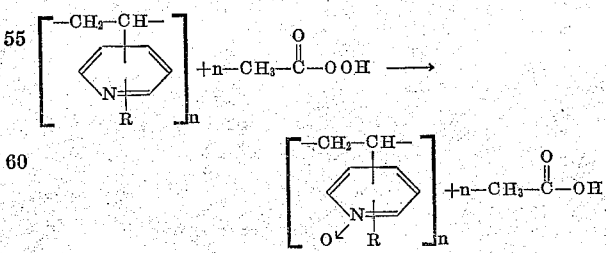

wherein R represents hydrogen and alkyl groups; and $n$ is a whole positive integer of such value that the molecular weight of starting polymer, expressed in terms of reduced viscosity, is a value of from about 0.10 to about 5.0. Preferred compound produced by the process of the present invention are those wherein R contains from 1 to 6 carbon atoms and $n$ is of such value that the starting polymer has reduced viscosity of from about 0.10 to about 5.0. Particularly preferred starting compounds are those represented by the above formula wherein R contains from 1 to 3 carbon atoms and the reduced viscosity of the starting polymer is from about 0.20 to 3.0.

As indicated above, the starting materials for the process of this embodiment of the present invention are the polymers prepared from pyridine compounds substituted with groups which contain polymerizable double bonds. Thus, the polymeric materials containing pyridine groups and conforming to the scope of the present invention, encompass those polymers in which the pyridine groups have been incorporated by a vinyl-type polymerization. Thus, any vinylpyridine such as the 2, 3, or 4-vinylpyridine, or substituted vinylpyridines, or pyridines substituted with any group containing a polymerizable double bond would be suitable for preparing the starting materials of this invention. For example, compounds which can be polymerized to form the starting materials of this invention would include, among others, 2-methyl-5-vinylpyridine, 2-vinyl-5-ethylpyridine, 3-vinylpyridine, 4-vinylpyridine, vinyl substituted quinolines, isoquinolines, acridines, piperidines, and the like. The art is well apprised of methods for the polymerization of pyridine monomers containing polymerizable double bonds. For example, vinyl pyridine polymers can be prepared by either bulk or persulfate emulsion processes.

While the pyridine compounds can be conveniently homopolymerized, they can also be copolymerized with different pyridine compounds containing polymerizable double bonds, or copolymerized with other vinyl monomers which do not contain the pyridyl group. The second embodiment of the instant invention is therefore directed to a process for preparing fully and partially oxidized copolymers of vinylpyridines and other polymerizable unsaturated monomers. The copolymers obtained contain units having the formulae:

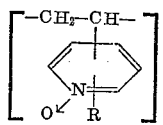

and

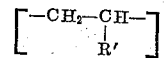

wherein R has the same value as previously defined and R' represents the side chain or residue of a polymerizable unsaturated monomer. More particularly, R' can represent chloro, bromo, and fluoro, alkyl, alkenyl, cycloalkyl, cycloalkylalkyl, alkylcycloalkyl, aryl, alkaryl, and aralkyl groups containing not more than 18 carbon atoms and preferably not more than 12 carbon atoms. The structure of the copolymer is preferably comprised of a plurality of

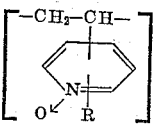

units which occur as a single unit or as a chain of units, each unit or chain connected to the next by one or more

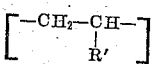

units, wherein R and R' have the same value as previously indicated.

Illustrative vinyl monomers with which the vinylpyridine can be copolymerized includes, among others, the aromatic monomers containing ethylenically unsaturated side chains such as styrene, chlorostyrene, allyl styrene and the like. Another typical group of polymerizable unsaturated monomers polymerizable with the vinyl pyridines are the vinyl esters of an inorganic acid such as vinyl chloride, vinyl bromide, vinyl fluoride, vinylidene chloride, vinyldene bromide, vinylidene fluoride. Other typical groups of polymerizable unsaturated monomers polymerizable with the vinylpyridines include: a vinyl ester of an aliphatic monocarboxylic acid, for example, vinyl acetate, vinyl butyrate, vinyl chloracetate, vinyl formate, vinyl caproate and the like; unsaturated aliphatic esters of a saturated aliphatic polybasic acid or an unsaturated aliphatic ester of an unsaturated aliphatic polybasic acid or unsaturated esters of dibasic aromatic acids, for example, the divinyl, diallyl and dimethallyl esters of oxalic, maleic, malonic citric, and tartartic acids the divinyl, diallyl and dimethallyl esters of phthalic, isophthalic, terephthalic and naphthalene dicarboxylic acids; monomers having a conjugated system of ethylenic double bonds, for instance, 1,3-butadiene, isoprene, 2,3-dimethyl-1,3-butadiene, 1-acetoxybutadiene 2-cyano-1,3-butadiene and the like; other suitable polymerizable monomers include acrylonitrile, methacrylonitrile, acetylene, alkyl actylenes, unsaturated aliphatic ethers of saturated polyhydric alcohols, for instance, divinyl, diallyl and dimethallyl ethers of glycol and the like.

Homopolymers and copolymers of most any desired degree of oxidation can be readily prepared from the polymeric pyridine compound by treatment with the appropriate amount of the organic oxidizing agent. Thus, partially oxidized polymers and copolymers can be prepared having from about 5 to about 95 percent of its pyridine rings converted to the N-oxide function. This is effected by employing an appropriate amount of oxidizing agent sufficient to oxidize the desired number of the pyridine units present in the polymer. By partial oxidation a fairly random distribution of oxidized and unoxidized units is obtained.

In some instances it has been observed that the degree of oxidation in the polymer is slightly higher than the theoretically expected value. It is believed that a small amount of oxidation may occur possibly in the form of air oxidation resulting in an oxygen content higher than that which would correspond to oxidation by the peracid alone. However, from the data hereinafter presented it is evident that the overall degree of oxidation of the polymer may be varied by varying the amount of oxidant employed. Hence, polymers possessing different degrees of hydrophilic and hydrophobic properties can be produced by varying the amount of oxidant used.

In accordance with the teachings of the present invention, the polymeric starting material is first dissolved in a suitable inert, normally-liquid, organic solvent and thereafter treated with an equal molar quantity of a 23 percent peracetic acid in ethyl acetate solution at a temperature of from about 20° C. to about 100° C. and more preferably at a temperature from about 50° C. to about 80° C. In order to provide a suitable reaction rate and to avoid undesirable side reactions, the latter temperature range is particularly preferred. The length of the reaction time will vary depending, in part, upon whether a complete or partial oxidation is desired and on the particular polymeric compound chosen as the starting material. It should be noted that when partial oxidation is desired less than an equal molar quantity of oxidizing agent to pyridine nitrogens present in the polymer will be employed. Recovery of the polymeric pyridine N-oxide product can be effected by methods known to the art. For example, the product can be precipitated with sodium sulfate from an alkaline solution and dried by azeotropic distillation with benzene. Other known recovery methods can equally as well be employed.

Suitable inert, normally-liquid, organic solvents which can be employed as the reaction medium in the practice of the present invention including among others acetonitrile, benzene, glacial acetic acid, ethyl acetate, chloroform, and the like. It is to be understood that the particular solvent chosen must be inert towards both the oxidizing agent and the starting polymeric compound.

The organic oxidizing agents employed in the practice of this invention can be any suitable organic peracid such as perbenzoic acid, monoperphthalic acid, performic acid, perpropionic acid, hydroperoxides, and the like. For example, the oxidation can be conducted equally as well with a solution of hydrogen peroxide in glacial acetic acid which contains catalytic amounts of strong mineral acid.

The compounds of the present invention are extremely versatile and find extensive application in a variety of fields. Upon partial or complete oxidation, it has been noted that the vinylpyridine polymers acquire a pronounced hydrophilic character which imparts to them many useful properties. For instance, the homopolymer of 2-methyl-5-vinylpyridine, having a reduced viscosity of 0.44, is rendered completely water soluble when reacted with an amount of peracetic acid sufficient to convert 80 percent, or more, of its pyridine nitrogen atoms to the N-oxide group. It has been observed that this solubility feature exists over a broad temperature range. The oxidized polymeric 2-vinyl-5-ethylpyridines also possess unique water solubility features, thus rendering both classes of compounds useful where thickening and coagulating agents are desirable. When the aforesaid polymers are prepared by treating the unoxidized polymeric 2-vinyl-5-ethylpyridine with an amount of oxidant sufficient to react with 50 percent or less of the pyridine nitrogen present they are insoluble in water but soluble in common organic solvents such as acetonitrile, chloroform, alcohols, and the like. The aforesaid hydrophilic character of the oxidized vinylpyridine polymers also leads to numerous other properties having commercial value. For instance, the dyeability of various acrylic fibers is increased when the fibers are spun from a mixture incorporating an oxidized polymeric vinylpyridine. The great versatility of the oxidized polymers and copolymers prepared by the process of the present invention is attributed not only to the wide degree of oxidation that is possible, but also to the range in molecular weight which may be regulated by the standard techniques practiced in vinyl polymerization.

Table I, below, summarizes the solubility characteristics of typical oxidized polymers of vinylpyridines:

TABLE I

| Monomer | $I_R$[1] | Degree of Oxidation[2] | Solubility[3] | | | |
|---|---|---|---|---|---|---|
| | | | Water | Acetonitrile | Alcohols | Chloroform |
| 2-vinyl-5-ethylpyridine | 0.40 | 25 | − | + | + | + |
| Do | 0.40 | 50 | − | + | + | + |
| Do | 0.40 | 100 | + | + | + | + |
| Do | 2.26 | 100 | + | + | + | + |
| 2-methyl-5-vinylpyridine | 0.44 | 80 | + | − | + | + |
| Do | 0.44 | 90 | + | − | + | + |
| Do | 0.44 | 100 | + | − | ± | ± |
| Do | 0.45 | 25 | − | ± | + | + |
| Do | 0.45 | 50 | − | ± | + | + |
| Do | 0.24 | 33 | − | ± | + | + |
| Do | 0.24 | 100 | + | − | + | + |
| Do | 2.10 | 50 | − | − | − | − |
| Do | 2.10 | 100 | + | − | − | − |

[1] Reduced viscosity measured at a concentration of 0.2 gram of polymer in 100 milliliters of dimethylformamide at 30° C.
[2] Molar ratio of peracetic acid to contained pyridine rings, expressed as a percentage.
[3] + indicates soluble; − indicates insoluble.

While both the oxidized 2-methyl-5-vinylpyridine and 2-vinyl-5-ethylpyridine homopolymers possess the common water solubility feature, they also differ in several respects. In contrast to the highly oxidized 2-methyl-5-vinylpyridine polymers, that is, over 80 percent oxidized, the fully oxidized 2-vinyl-5-ethylpyridine polymers are soluble in acetonitrile as well as water. A further distinguishing feature was noted in the relationship of temperature and water solubility. As previously indicated, the oxidized 2-methyl-5-vinylpyridine polymers, prepared from 80–100 percent of the theoretical amount of peracetic acid, are highly water soluble over a broad temperature range. In contrast, the solubility of oxidized polymeric 2-vinyl-5-ethylpyridine decreases when an aqueous solution of the polymer is heated above room temperature. For example, a fully oxidized polymeric 2-vinyl-5-ethylpyridine prepared from polymeric 2-vinyl-5-ethylpyridine of reduced viscosity 2.26 is insoluble in water at a temperature of 28° C. and higher. Thus, this compound is readily recoverable from its aqueous solution merely by heating the medium.

The following examples illustrate the practice of this invention.

EXAMPLE I

*Preparation of a Completely Oxidized 2-Methyl-5-Vinylpyridine Polymer*

An ethyl acetate solution containing 2-methyl-5-vinylpyridine polymer characterized by a reduced viscosity of 0.24 and which had been prepared by peroxide-catalyzed bulk polymerization, was stripped at a temperature of of 70–80° C. and a pressure of 2.5 millimeters of mercury to remove all solvent and traces of unreacted monomer. The light brown brittle polymer which remained (25 grams, 0.19 mole), was dissolved in 200 milliliters of ethyl acetate by stirring at 55°–75° C. Thereafter, 62.5 grams (0.19 mole) of a 23 percent solution of peracetic acid in ethyl acetate was added with stirring over a two-hour period. The solvent was then stripped off leaving a water-soluble residue. This residue was dissolved in 200 milliliters of water, filtered and the pH of the solution adjusted to approximately 7 by the addition of aqueous sodium hydroxide. After removal of a small amount of insoluble material by filtration, the filtrate was made strongly alkaline with aqueous sodium hydroxide. Sodium sulfate was added to the clear solution causing separation of the free basic polymer which was separated and dried by azeotropic distillation with benzene. The dry polymer was dissolved in chloroform and filtered to remove suspended inorganic material. Evaporation of chloroform from the filtrate left 25 grams of a light buff-yellow polymer. In addition to its water solubility, the polymer was found to be soluble in the common alcohols and insoluble in acetonitrile, dioxane, acetone and ethyl acetate.

EXAMPLE II

*Preparation of a Partially Oxidized 2-Methyl-5-Vinylpyridine Polymer*

To a stirred, refluxing (75° C.) ethyl acetate solution containing 21.8 grams (0.183 mole) of 2-methyl-5-vinylpyridine polymer having a reduced viscosity of 0.24, was added 20.1 grams (0.061 mole) of a 23 percent solution of peracetic acid over a 36-minute period. The mixture was refluxed for an additional two hours and, after removal of ethyl acetate by stripping under reduced pressure, the free polymeric base was liberated by treatment with excess aqueous sodium hydroxide. The rubbery polymer was then dried and purified by dissolving in acetone and filtering. Evaporation of acetone from the filtrate left 17.1 grams of polymer as a light tan solid residue. This partially oxidized 2-methyl-5-vinylpyridine polymer was found to be insoluble in water and soluble in chloroform, alcohols and acetonitrile.

EXAMPLE III

*Preparation of a Partially Oxidized 2-Methyl-5-Vinylpyridine Polymer*

A sample (22 grams, 0.185 mole) of monomer-free polymeric 2-methyl-5-vinylpyridine having a reduced viscosity of 0.45 in dimethylformamide, was dissolved in 200 milliliters of ethyl acetate. A 22 percent solution of peracetic acid in ethyl acetate (15.9 grams, 0.046 mole) was then added with stirring over a 33-minute period while the temperature was maintained at 71–72° C. Following the addition of peracetic acid, the reaction mixture was stirred for an additional four-hour period at 72° C. and then allowed to cool. Ethyl acetate was stripped from the reaction mixture under reduced pressure and the resulting acetic acid salt of the polymer dissolved in 750 milliliters of water. The aqueous solution was filtered and the free basic polymer was liberated as a heavy flocculent precipitate by making the filtrate strongly basic with aqueous sodium hydroxide. The polymer was collected on a filter, dried in vacuum and purified by dissolving in hot acetonitrile and filtering. Evaporation of acetonitrile from the filtrate left 13 grams of light brown polymer. The polymer was found to be soluble in alcohols, chloroform and refluxing acetone but insoluble in water.

EXAMPLE IV

*Preparation of a Completely Oxidized 2-Methyl-5-Vinylpyridine Polymer*

A solution of polymerized 2-methyl-5-vinylpyridine having a reduced viscosity of 0.44 was prepared by stirring 25 grams (0.21 mole) of the polymer with 500 milliliters of refluxing ethyl acetate. To this stirred solution, maintained at 70–72° C., was added 74 grams (0.21 mole) of a 21.8 percent solution of peracetic acid in ethyl acetate over a period of 30 minutes. After the addition was complete, the mixture was stirred at 70° C. for an additional 40-minute period before allowing to cool. The solvent was then distilled under reduced pressure and the residue dissolved in 500 milliliters of water. An aqueous solution of 15 grams of sodium hydroxide was added to neutralize the acetic acid and the solution was filtered to remove a small amount of insoluble material. The clear yellow filtrate was saturated with sodium sulfate which caused the water-soluble polymer to separate as a gummy elastic mass. The crude polymer was vacuum-dried and freed of inorganic material by dissolving in a mixture of chloroform and isopropyl alcohol (2:1) and filtering. Upon evaporation of the solvents at reduced pressure, 23 grams of polymer remained. The polymer was soluble in water and alcohols, but it was insoluble in acetonitrile.

EXAMPLE V

*Preparation of a Partially Oxidized 2-Vinyl-5-Ethylpyridine Polymer*

A sample (132 grams, 1.0 mole) of polymeric 2-vinyl-5-ethylpyridine having a reduced viscosity of 0.40 was dissolved in 800 milliliters of ethyl acetate at 75–77° C. with stirring. To this solution was then added 192 grams (approximately 0.5 mole) of a 20.8 percent solution of peracetic acid, in ethyl acetate, over a period of 30 minutes. After the feed was added, the mixture was stirred and refluxed at 77° C. for an additional 45 minute period. The ethyl acetate was then stripped from the reaction mixture under reduced pressure. The residue was dissolved in water and the solution made strongly basic by the addition of aqueous sodium hydroxide which caused precipitation of the polymer. The polymer was water-washed, dried in vacuum and then dissolved in a methanol-chloroform mixture. The resulting solution was filtered through "Hyflo" and the filtrate stripped free of solvents to obtain 139 grams of dry polymer as a light-brown bubbly solid.

The polymer was found to be soluble in alcohols, chloroform and acetonitrile.

EXAMPLE VI

*Preparation of a Completely Oxidized 2-Vinyl-5-Ethylpyridine Polymer*

A solution of 132 grams of polymeric 2-vinyl-5-ethylpyridine (1 mole) having a reduced viscosity of 0.40, was oxidized with a slight excess (1.05 moles) of peracetic acid solution (385 grams of 20.8 percent solution) at 76–78° C. The addition of peracetic acid required 1.5 hours and the reaction mixture was allowed to stir for an additional four-hour period at 78° C. following completion of the feed. The reaction mixture was stripped free of ethyl acetate and the residue dissolved in water. Aqueous sodium hydroxide was added to make the solution strongly basic and the mixture was saturated with sodium sulfate to precipitate the polymer. The crude polymer was dried, dissolved in methanol-chloroform solution and filtered to remove impurities. The filtrate was stripped free of solvents at reduced pressure, leaving 150 grams of polymer. The polymer was found to be soluble in cold water ($<\sim 28°$ C.), but completely insoluble at all temperatures above approximately 28° C. It was also soluble in acetonitrile and alcohols but was insoluble in acetone.

EXAMPLE VII

*Preparation of a Completely Oxidized 2-Vinyl-5-Ethylpyridine Polymer*

To 1370 grams of an ethyl acetate solution containing 50 grams (0.373 mole) of polymeric 2-vinyl-5-ethylpyridine, having a reduced viscosity of 2.26, was added at 70–72° C., with stirring, 115 grams (0.373 mole) of a 24.7 percent solution of peracetic acid in ethyl acetate over a 20-minute period. Following addition of the peracetic acid, stirring and heating were continued at 68°–72° C. for an additional six hour period before the reaction mixture was allowed to cool. The acetic acid salt of the oxidized polymer separated from the mixture, upon cooling, as a dark, rubbery solid.

The solid material was taken up in 1000 milliliters of water and insoluble impurities were removed by centrifugation. To one-half of the water solution of polymer acetate was then added a solution of 10 grams of sodium hydroxide in 50 milliliters of water and the viscous, dark-colored polymer which separated was collected by centrifugation followed by decantation of the upper aqueous layer. After drying in vacuum, the polymer weighed 23.8 grams. The polymer was found to be soluble in cold water (below 27–28° C.) but precipitated from even dilute solutions upon warming above 28° C. The product was also soluble in alcohols, chloroform and acetonitrile.

Although the invention has been illustrated by the preceding examples, the invention is not to be construed as limited to the materials employed therein, but rather, the invention encompasses the generic invention as hereinbefore disclosed. Various modifications and embodiments of this invention can be made without departing from the spirit and scope thereof.

What is claimed is:

1. A process for the preparation of a polymer containing a plurality of pyridine N-oxide groups which comprises forming a mixture, in an inert, normally-liquid, organic medium, of a polymer containing a plurality of pyridine groups and an organic peracid oxidizing agent; said polymer containing the pyridine groups obtained by the polymerization of at least one vinyl monomer; and said polymer being characterized by a reduced viscosity of from about 0.10 to about 5.0 as measured at a concentration of 0.2 gram of polymer in 100 milliliters of dimethylformamide at 30° C.; heating said mixture to a temperature of from about 20° C. to about 100° C., and recovering the oxidized polymer.

2. A process for the preparation of a polymer containing a plurality of pyridine N-oxide groups which comprises forming a mixture, in an inert, normally-liquid, organic medium, of a polymer containing a plurality of pyridine groups and an organic peracid oxidizing agent; said oxidizing agent being present in a quantity at least equimolar to that of the pyridine groups present in said polymer; said polymer obtained by the polymerization of at least one vinyl monomer; and said polymer being characterized by a reduced viscosity of from about 0.10 to about 5.0 as measured at a concentration of 0.2 gram of polymer in 100 milliliters of dimethylformamide at 30° C.; heating said mixture to a temperature of from about 20° C. to about 100° C., and recovering the oxidized polymer.

3. A process for the preparation of a partially oxidized polymer containing a plurality of pyridine N-oxide groups which comprises forming a mixture, in an inert, normally-liquid, organic peracid medium of a polymer containing a plurality of pyridine groups and an organic oxidizing agent; the quantity of said oxidizing agent present obtained by the polymerization of at least one vinyl monomer; and said polymer being less than equimolar to the quantity of the pyridine groups present in said polymer; said polymer being characterized by a reduced viscosity of from about 0.10 to about 5.0 as measured at a concentration of 0.2 gram of polymer in 100 mililliters of dimethylformamide at 30° C.; heating said mixture to a temperature of from about 20° C. to about 100° C., and recovering the partially oxidized polymer.

4. A process as claimed in claim 3 wherein from about 5 to about 95 per cent of the pyridine groups of said polymer have been oxidized to the N-oxide function.

5. A process for the preparation of a polymer characterized by the formula:

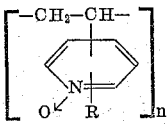

which comprises forming a mixture in an inert, normally-liquid organic medium of a starting compound having the following formula and an organic peracid oxidizing agent:

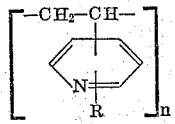

where in each formula R represents a member selected from the group consisting of hydrogen and alkyl groups of from 1 to 6 carbon atoms; and $n$ is a whole positive integer of such value that the molecular weight of said starting compound, expressed in terms of reduced viscosity, is a value of from about 0.10 to about 5.0; said reduced viscosity being measured at a concentration of 0.2 gram of said compound in 100 milliliters of dimethylformamide at 30° C.; heating said mixture to a temperature of from about 20° C. to about 100° C., and recovering the oxidized polymer.

6. A process for the preparation of a copolymer consisting of units represented by the formulae:

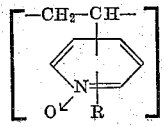

and

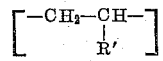

which comprises forming a mixture, in an inert, normally-liquid, organic medium of an organic peracid oxidizing agent and a starting copolymer consisting of units represented by the formula:

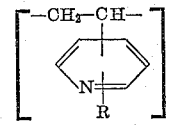

and

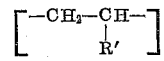

where in each formula R represents a member selected from the group consisting of hydrogen and alkyl groups of from 1 to 6 carbon atoms: R' represents the side chain of a polymerizable unsaturated monomer containing not more than 18 carbon atoms; and the molecular weight of said starting copolymer, expressed in terms of reduced viscosity, is a value of from about 0.10 to about 5.0; said reduced viscosity being measured at a concentration of 0.2 gram of said copolymer in 100 milliliters of dimethylformamide at 30° C., heating said mixture to a temperature of from about 20° C. to about 100° C., and recovering the oxidized copolymer.

7. A process as claimed in claim 5 wherein said polymer is polymerized 2-methyl-5-vinylpyridine.

8. A process as claimed in claim 5 wherein said polymer is polymerized 2-ethyl-5-vinylpyridine.

9. A process as claimed in claim 6 wherein said copolymer contains 2-methyl-5-vinylpyridyl groups.

10. A process as claimed in claim 6 wherein said copolymer contains 2-ethyl-5-vinylpyridyl groups.

11. A process as claimed in claim 5 wherein said oxidizing agent is peracetic acid.

12. A process as claimed in claim 6 wherein said oxidizing agent is peracetic acid.

13. A process for the preparation of a polymer containing a plurality of pyridine N-oxide groups which comprises forming a mixture of a polymer containing a plurality of pyridine groups and an organic peracid oxidizing agent; said polymer containing the pyridine groups obtained by the polymerization of at least one vinyl monomer; and said polymer being characterized by a reduced viscosity of from about 0.10 to about 5.0 as measured at an concentration of 0.2 gram of polymer in 100 milliliters of dimethylformamide at 30° C.; heating said mixture to a temperature of from about 20° C. to about 100° C., and recovering the oxidized polymer.

References Cited in the file of this patent
UNITED STATES PATENTS

| | | |
|---|---|---|
| 2,749,349 | Cislak | June 5, 1946 |
| 2,448,542 | McQueen et al. | Sept. 7, 1948 |
| 2,995,562 | Ames | Aug. 8, 1961 |